(12) United States Patent
Kikuchi et al.

(10) Patent No.: US 6,587,646 B2
(45) Date of Patent: Jul. 1, 2003

(54) MAINTENANCE SYSTEM AND METHOD FOR PERFORMING APPARATUS MANAGEMENT USING NETWORK

(75) Inventors: Kunihiro Kikuchi, Kanagawa (JP); Hisao Nomura, Tokyo (JP); Shinsuke Azakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/843,712

(22) Filed: Apr. 30, 2001

(65) Prior Publication Data

US 2002/0001475 A1 Jan. 3, 2002

(30) Foreign Application Priority Data

May 18, 2000 (JP) ........................................ 2000-146924
Apr. 10, 2001 (JP) ........................................ 2001-111350

(51) Int. Cl.[7] .............................................. G03G 15/00
(52) U.S. Cl. ............................................. 399/8; 399/11
(58) Field of Search ............................. 399/8, 9, 11, 79

(56) References Cited

U.S. PATENT DOCUMENTS 5,615,121 A * 3/1997 Babayev et al. ............ 395/209
6,006,171 A * 12/1999 Vines et al. ................. 702/184
6,317,570 B1 * 11/2001 Uchida et al. .................. 399/8
2002/0032809 A1 * 3/2002 Bateman et al. ............... 710/5

FOREIGN PATENT DOCUMENTS

| JP | 11-134058 | * | 5/1999 |
| JP | 11-163920 | * | 6/1999 |
| WO | 99/34312 | * | 7/1999 |

* cited by examiner

*Primary Examiner*—Quana M. Grainger
(74) *Attorney, Agent, or Firm*—Fitzpatrick, Cella, Harper & Scinto (57) ABSTRACT

A maintenance system for improving maintenance service includes a copying machine and a management server. When a copying machine uses a communication server to notify a management server of malfunction, the management server posts malfunction details and the names of components required for repair to an information terminal of a serviceperson. The copying machine is notified of an estimated time of arrival of the serviceperson, and the time is displayed on an operation panel.

22 Claims, 8 Drawing Sheets

MAINTENANCE SYSTEM AND METHOD FOR PERFORMING APPARATUS MANAGEMENT USING NETWORK

BACKGROUND OF THE INVENTION

1. Field of the Invention

The present invention relates to service systems for performing electronic apparatus maintenance, and in particular, to a maintenance-service system suitable for office apparatuses such as copying machines.

2. Description of the Related Art

Conventionally, servicepersons of sales companies periodically inspect or perform maintenance on electronic apparatuses such as copying machines. Servicepersons repair electronic apparatuses upon notification from users.

The main unit of each copying machine has a malfunction-diagnosis function and a function for storing copying-machine-condition information (date, the number of copies produced, circuit-related measurements, etc.) in an internal memory. Servicepersons read malfunction-diagnosis results and condition information which are stored in the internal memory, and determine the details of maintenance and repair (hereinafter generally referred to as "maintenance").

A serviceperson cannot know the details of maintenance unless the serviceperson goes to check the copying machine. Accordingly, the serviceperson must always carry various types of components for replacing types of components having a high possibility of breaking as well as highly consumable parts. If the serviceperson does not carry the necessary components, the serviceperson may have to go back to the company to bring the components.

In addition, the copying machine user may not know the time at which the serviceperson will arrive to check the copying machine and, the serviceperson cannot inform the copying machine user of the time of arrival

SUMMARY OF THE INVENTION

Accordingly, it is an object of the present invention to provide a maintenance-service system that increases the efficiency of maintenance operations.

To this end, according to an aspect of the present invention, the foregoing object is achieved through provision of a maintenance system for using a network to manage apparatuses linked thereto. The maintenance system includes a receiver unit for receiving maintenance information required for the maintenance of each of the managed apparatuses, a message-transfer unit for transferring, to an information terminal of a serviceperson, a message created based on the received maintenance information by the message-transfer unit and which instructs the serviceperson to perform maintenance, an input unit for allowing the serviceperson to input, when the transferred massage is displayed by the information terminal, an estimated time of arrival at a place having a managed apparatus that requires the maintenance, and a transfer unit for transferring the input estimated time of arrival to the managed apparatus.

According to another aspect of the present invention, the foregoing object is achieved through provision of a maintenance method for using a network to manage apparatuses linked thereto. The maintenance method includes a receiving step for receiving maintenance information required for the maintenance of each of the managed apparatuses, a message-transfer step for generating a maintenance-instructing message based on the received maintenance information and for transferring the message to an information terminal of a serviceperson, and a transfer step for, when the message is displayed by the information terminal, transferring, to a managed apparatus that requires the maintenance, an estimated time of arrival at which the serviceperson can arrive at a place having the managed apparatus and which is input from the information terminal by the serviceperson.

According to another aspect of the present invention, the foregoing object is achieved through provision of a computer-readable recording medium containing a control program for controlling a maintenance system for using a network to manage apparatuses linked thereto. The control program controls a computer in the maintenance system to execute a process including a receiving step for receiving maintenance information which is required for the maintenance of each of the managed apparatuses, a message-transfer step for generating a maintenance-instructing message based on the received maintenance information and for transferring the message to an information terminal of a serviceperson, and a transfer step for, when the message is displayed by the information terminal, transferring, to a managed apparatus that requires the maintenance, an estimated time of arrival at which the serviceperson can arrive at a place having the managed apparatus and which is input from the information terminal by the serviceperson.

According to another aspect of the present invention, the foregoing object is achieved through provision of a control program for controlling a maintenance system for using a network to manage apparatuses linked thereto. The control program controls a computer in the maintenance system to execute a process including a receiving step for receiving maintenance information which is required for the maintenance of each of the managed apparatuses, a message-transfer step for generating a maintenance-instructing message based on the received maintenance information and for transferring the message to an information terminal of a serviceperson, and a transfer step for, when the message is displayed by the information terminal, transferring, to a managed apparatuses that requires the maintenance, an estimated time of arrival at which the serviceperson can arrive at a place having the managed apparatus and which is input from the information terminal by the serviceperson.

Further objects, features and advantages of the present invention will become apparent from the following description of the preferred embodiments with reference to the attached drawings.

DESCRIPTION OF THE PREFERRED EMBODIMENTS

An embodiment of the present invention is described below with reference to the accompanying drawings.

Figure 1:
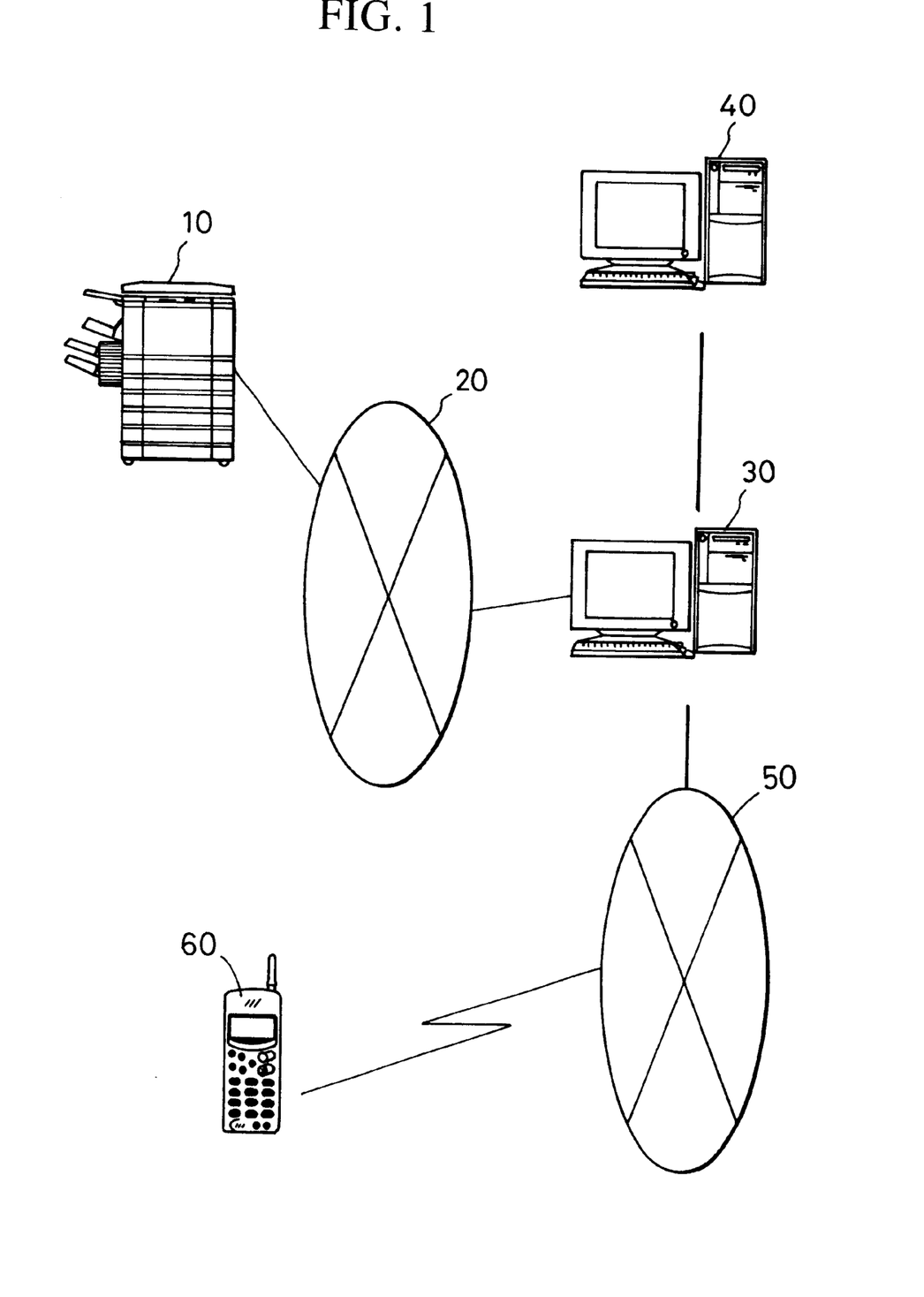
FIG. 1 is a block diagram showing the entire configuration of a maintenance system according to an embodiment of the present invention.

FIG. 1 shows the entire configuration of a maintenance system according to an embodiment of the present invention. In this embodiment, electronic apparatuses 10 (only one electronic apparatus is shown in FIG. 1 for brevity of description) to be maintained are specifically copying machines. However, the electronic apparatuses 10 are not limited to copying machines, and may be office (peripheral) apparatuses such as printers, scanners, or multifunction apparatuses.

The copying machines 10 are linked to a communication network 20 such as the Internet. Each copying machine 10 has a communication function (i.e., a communication circuit such as a modem in hardware form and a TCP/IP-type communication program in software form) for establishing communication with other apparatuses via the communication network 20. There may be a case in which each copying machine 10 is linked to the communication network 20 via a communication server (not shown) of a company, called a "provider", which establishes a link to a communication network.

Each copying machine 10 uses a conventionally known malfunction-diagnosis function to diagnose malfunctions. If a malfunction is detected, the copying machine 10 uses the communication function to notify a management server 40 of details of the diagnosis.

When the copying machine 10 malfunctions, and requires repair by a serviceperson, the copying machine 10 is notified of this requirement (after reporting the malfunction to the management server 40), and displays the notification from the management server 40 on, for example, an operation panel.

Although the Internet is used as an example of the communication network 20 in this embodiment, a wide area network (WAN) and other types of known communication networks can be used.

The communication server 30 is used to establish communication with individual mobile phones 60 (only one mobile phone is shown in FIG. 1 for brevity of description), which will be described later. The communication server 30 has a communication program for establishing communication with each copying machine 10 and a communication program for establishing communication with each mobile phone 60. A file transfer program and an e-mail communication program can be used as the communication program for establishing communication with each copying machine 10. An e-mail communication program can be used as the communication program for establishing communication with each mobile phone 60.

The communication server 30 also has a communication program for transferring to/from the management server 40 information that is exchanged between the copying machine 10 and the mobile phone 60. In this embodiment, a program called "mail server" is used to perform information transfer among the management server 40, the copying machine 10, and the mobile phone 60 in the form of e-mail.

The management server 40 has an internal database with information on each copying machine 10. In the database, user names, addresses, machine-type names, and past-maintenance-record information are stored. In this embodiment, the management server 40 periodically receives maintenance-charge-related information, such as the number of copies produced from the copying machine 10 via the communication server 30. The lease (rental) or maintenance charge of each copying machine 10 depends on the number of copies produced, and the user of the copying machine 10 is charged. Charging may be in the form of a bill or in the form of electronic money settlement.

The management server 40 has a communication program for communicating with the communication server 30 and a processing program for processing information received from each copying machine 10 and each mobile phone 60 via the communication program. Information processing by the management server 40 includes writing to the internal database, and reading and retrieval of specified data.

The management server 40 stores the maintenance information that is periodically sent from the copying machines 10. Also, the management server 40 determines, based on urgently-sent malfunction-diagnosis information, the components necessary for repair, and posts malfunction details, such as the names of necessary components (component numbers), the quantities thereof, and the name of a user of the copying machine 10, to the mobile phone 60 carried by the serviceperson. The management server 40 calculates the lease or rental charge in accordance with the number of copies produced, which is included in the maintenance information, and uses a printer to print a lease or rental charge bill. The maintenance information is divided into two types. One is maintenance-management information for prompting apparatus-maintenance management and the other is error information representing apparatus-related error.

A communication network 50 is used to establish communication between each mobile phone 60 and the communication server 30, and is a public telephone network in this embodiment. Each mobile phone 60 has an e-mail function. In this embodiment, a maintenance-service system of the present invention is realized by the communication server 30 and the management server 40, as will be described later.

Maintenance service performed in the above-described system configuration is described below with reference to FIGS. 2 to 4.

Figure 2:
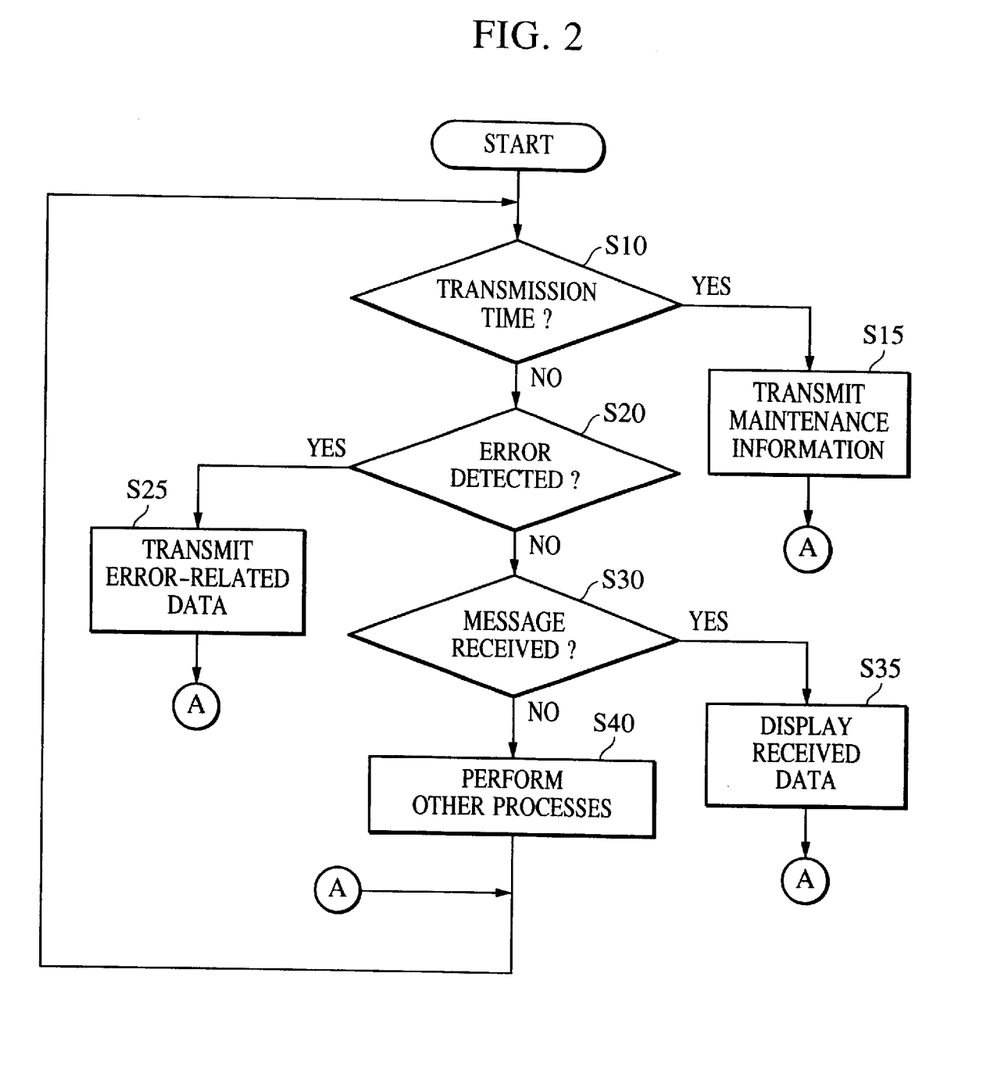
FIG. 2 is a flowchart showing the process of the copying machine 10 shown in FIG. 1.

FIG. 2 shows the process executed by a CPU in each copying machine 10. FIG. 3 shows the process executed by the communication server 30. FIG. 4 shows a process as an interruption by the management server 40.

The copying machine 10 transmits maintenance information to the management server 40 at a predetermined time, as indicated by steps S10 and S15 in FIG. 2. The maintenance information includes the number of copies produced, which is used to find a maintenance charge, the internal circuit voltage, current measurements, parameter values for error checking, a machine-type name, the date (including a time), and identification information indicating whether the transmitted data is an error notification or periodically sent maintenance data.

Figure 3:
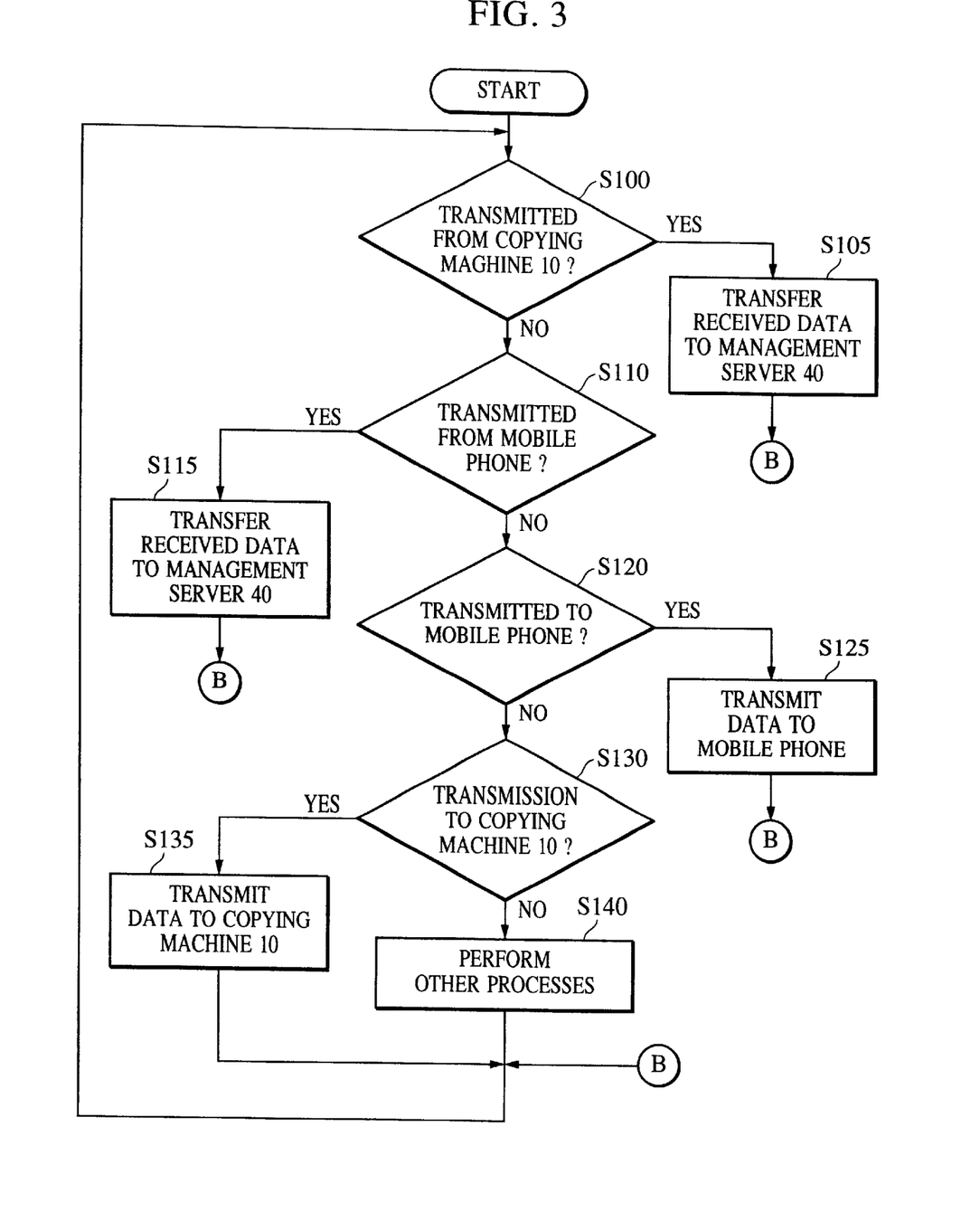
FIG. 3 is a flowchart showing the process of the communication server 30 shown in FIG. 1.

When the communication server 30 detects data transmission from the copying machine 10, as indicated by step S100 in FIG. 3, it transfers the received data to the management server 40, as indicated by step S105 in FIG. 3.

Based on identification information included in the received data, the management server 40 determines the type of the received data. When the received data is maintenance information, the management server 40 stores the received data, as indicated by steps S200 and S201 in FIG. 4.

Next, the management server 40 determines, based on, for example, the number of copies produced which is included in the maintenance information, whether or not paper must be supplied. When paper must be supplied, the management server 40 uses the machine-type name of the copying machine 10 to search the database for the mail address of the mobile phone 60, which is carried by the serviceperson, and informs the serviceperson by e-mail of the need for paper, as indicated by steps S202 and S203 in FIG. 4. The management server 40 also determines whether an event has occurred about which maintenance or periodic inspection is required and which differs from malfunction. If such an event has occurred, the management server 40 uses e-mail to inform the serviceperson in charge of maintenance or inspection.

The e-mail function of the mobile phone 60 displays the e-mail addressed to the serviceperson on a display unit, whereby the serviceperson can know the details of maintenance or inspection that must be performed for the copying machine 10 of the user. Also, the management server 40 transmits, to the copying machine 10 that transmitted the maintenance information, a message indicating necessary maintenance or inspection details. When receiving this message, the copying machine 10 displays the received message on a display panel, as indicated by steps S30 and S35 in FIG. 2.

When using the malfunction-diagnosis function to detect error, as indicated by step S20 in FIG. 2, the copying machine 10 transmits error details, the machine-type name, the date, data identification information, etc., to the management server 40 via the communication server 30, as indicated by steps S25 in FIG. 2. The communication server 30 uses steps S100 and S105 (FIG. 3) to transfer, to the management server 40, the data transmitted from the copying machine 10.

When identifying the received data as error information, the management server 40 performs malfunction diagnosis for repair, based on error-detail data included in the received data. For example, repair details and necessary components that correspond to error details (including a default portion) are registered on a table or in a database beforehand. The management server 40 reads repair details, necessary components, and the quantities thereof, which correspond to the received error details, from the table or the database. The management server 40 transmits the repair details, the necessary components (replacement-part name), and the quantities thereof to the mobile phone 60 of the serviceperson. The management server 40 transmits, to the copying machine 10, a message that indicates the error details and that indicates that repair by the serviceperson will be performed, as indicated by steps S211 and S212 in FIG. 4.

When the process by the management server 40 is performed as described above, the communication server 30 performs data transfer to each data-transmitting destination and each data-transmitting source, as indicated by steps S105, S115, S125, and S135.

As described above, by exchanging maintenance-related information among the copying machines 10, the management server 40, and the mobile phone 60 of a serviceperson, the serviceperson can prepare tools and the components necessary for repair beforehand because the serviceperson can know error details without going to check each copying machine 10 in which error has occurred.

Figure 4:
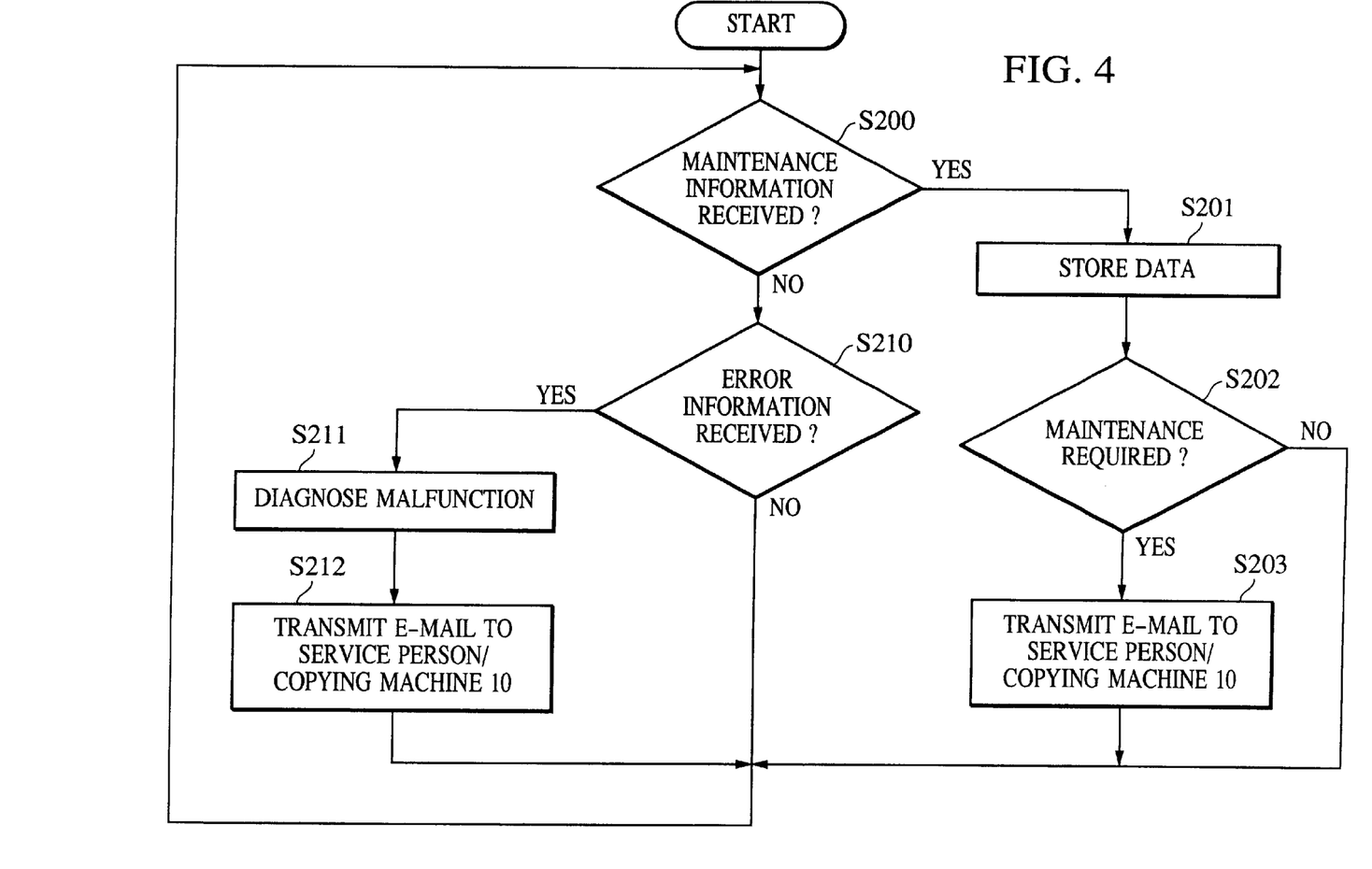
FIG. 4 is a flowchart showing the process of the management server 40 shown in FIG. 1.

Each of the processes in FIGS. 2 to 4 is described below.

The process (FIG. 2) executed by the CPU of each copying machine 10 is described below.

In step S10, the CPU determines whether the present time is a predetermined time for transmission. If the determination is affirmative ("YES" in step S10), in step S15, the CPU transmits, to the management server 40, maintenance information that includes the number of copies produced, which is used to determine a maintenance charge, an internal circuit voltage, current measurements, parameter values for error checking, a machine-type name, a date (including a time), and identification information indicating whether the transmitted data is either error notification or periodically-sent maintenance data.

If the determination in step S10 is negative, in step S20, the CPU determines whether error has occurred in the copying machine 10. If the CPU has determined, by using the malfunction-diagnosis function, that error has occurred ("YES" in step S20), in step S25, the CPU transmits error details, the machine-type name, the date, data-identification information, etc., to the communication server 30.

If the CPU has determined that no error has occurred, in step S30, the CPU determines whether the copying machine 10 has received a message from an external apparatus. If the copying machine 10 has received a message from an external apparatus ("YES" in step S30), in step S35, the CPU displays the received message on a display panel of the copying machine 10.

Next, the process (FIG. 3) executed by the communication server 30 is described below.

In step S100, the communication server 30 determines whether data has been transmitted from the copying machine 10. If the determination is affirmative ("YES" in step S100), in step S105, the communication server 30 transfers the received data to the maintenance system.

If the determination is negative ("NO") in step S100, in step S110, the communication server 30 determines whether data has been transmitted from one of the mobile phones 60.

If the communication server 30 determines that no data has been transmitted from one of the mobile phones 60 ("NO" in step S110), in step S120, the communication server 30 determines whether it needs data transmission to the mobile phone 60. If the communication server 30 has determined that it needs data transmission to the mobile phone 60 ("YES" in step S120), in step S125, the communication server 30 transfers data to the mobile phone 60.

In step S130, the communication server 30 determines whether it needs data transmission to the copying machine 10. If the determination is affirmative ("YES" in step S130), the communication server 30 transfers data to the copying machine 10.

FIG. 4 shows the process, which is executed by a CPU in the management server 40.

In step S200, the CPU determines, based on the identification information included in the received data, the data type thereof, thereby determining whether the received data is maintenance information.

If the received data is maintenance information ("YES" in step S200), in step S201, the CPU stores the received data in the internal database of the management server 40. In step S202, based on the stored maintenance information, the CPU determines whether maintenance of the copying machine 10 is required. For example, a parameter in the maintenance information, the number of copies produced is used to determine whether paper must be supplied. If maintenance is required ("YES" in step S202), the CPU acquires the e-mail address of the serviceperson's mobile phone 60, and transmits a maintenance-requiring message to the mobile phone 60 by e-mail. The data transmission is executed in step S125 in FIG. 3 by transferring the mail address of the mobile phone 60 and the maintenance-requiring message to the communication server 30.

When paper must be supplied, the machine-type name of the copying machine 10 is used to search the database for the mail address of the serviceperson's mobile phone 60, and the management server 40 creates a message indicating that paper must be supplied. The management server 40 also determines whether an event has occurred about which maintenance or periodic inspection is required and that differs from malfunction. If such an event has occurred, the management server 40 uses e-mail to inform the serviceperson in charge of maintenance or inspection of the occurrence.

When the received data is not maintenance information, in step S210, the CPU determines whether the received data is error information. If the CPU has determined, based on the identification information included in the received data, that the received data is information relating to detected error ("YES" in step S210), in step S211, the CPU performs a malfunction-related diagnosis for repair, based on error data (data representing error details) included in the received data.

For example, repair details and necessary components that correspond to the error details (including a default portion) are registered on a table or in a database beforehand. The management server 40 reads repair details, the necessary components, and the quantities thereof, which correspond to the received error details, from the table or the database.

In step S212, the management server 40 transmits the repair details, the necessary components (replacement-part name), and the quantities thereof to the mobile phone 60 of the serviceperson. The management server 40 transmits, to the copying machine 10, a message that indicates the error details and that indicates that repair by the serviceperson will be performed.

The following embodiment other than the above-described embodiment can be implemented.

In the above-described embodiment, the copying machine 10 automatically detects an error and notifies the management server 40 of the detection. However, the user of the copying machine 10 may notify a copying-machine maintenance company or a copying-machine sales company of the details of malfunction by telephone. In this case, a detailed malfunction-related diagnosis is performed in the management server 40 by using a keyboard and/or a mouse of the management server 40 to input malfunction-related diagnosis items.

The user may notify by e-mail the management server 40 of error from a personal computer of the user, etc.

Measurements of each circuit in the copying machine 10, which are used to determine errors in currents, voltages, etc., may be transmitted to the management server 40 without simply diagnosing the copying machine 10.

In the above-described embodiment, it is assumed that the serviceperson quickly repairs the copying machine 10 based on information from the copying machine 10. However, when an error occurs about which the serviceperson does not need to repair the copying machine 10, by storing the details of the error in the database of the management server 40, the serviceperson may deal with the error at a periodic inspection. In this case, the management server 40 notifies the copying machine 10 or the user's personal computer that the serviceperson will repair the copying machine 10.

In the above-described embodiment, when the serviceperson's mobile phone 60 is notified of the occurrence of an error by the management server 40, the serviceperson can use the mobile phone 60 to transmit an estimated time of arrival to the management server 40, and the management server 40 can notify the copying machine 10 (that requires repair) of the estimated time of arrival. In this case, the serviceperson may input the estimated time of arrival by using the ten-key pad of the mobile phone 60. In addition, an input form may be employed in which the management server 40 transmits a plurality of estimated times of arrival from which an estimated time of arrival is to be selected, to the mobile phone 60, and the serviceperson uses the ten-key pad to select one of the estimated times displayed by the mobile phone 60.

Figure 5:
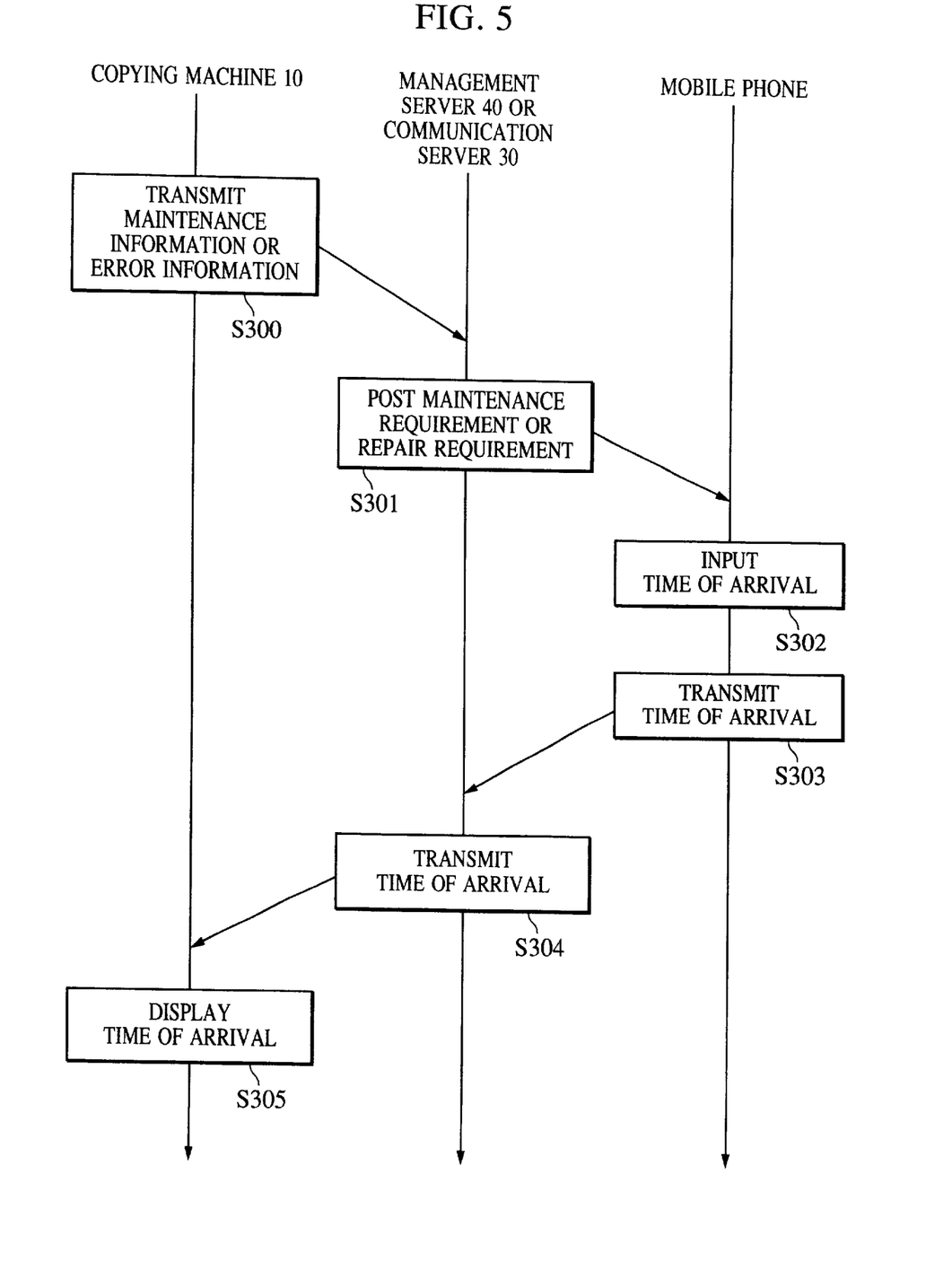
FIG. 5 is a flowchart showing a first combined process for notifying the copying machine 10 (FIG. 1) that a serviceperson will arrive.

FIG. 5 is a flowchart of a combined process for notifying the copying machine 10 of an estimated time of arrival.

In step S300, the copying machine 10 transmits maintenance information or error information. Step S300 corresponds to each of steps S15 and S25 in FIG. 2.

The management server 40 (or the communication server 30) determines whether maintenance is required (step S202 in FIG. 4), or performs a malfunction-related diagnosis (step S211 in FIG. 2). If the management server 40 has determined that maintenance is required, in step S301, the management server 40 acquires the mail address of the serviceperson's mobile phone 60, and transmits, to the mobile phone 60, a message indicating that maintenance is required. If the management server 40 has determined that repair is required, in step S301, the management server 40 transmits, to the mobile phone 60, a message indicating that repair is required. Step S301 corresponds to each of steps S203 in FIG. 4, S212 in FIG. 4, and S125 in FIG. 3.

At this time, the management server 40 (or the communication server 30) also transmits a place at which the copying machine 10 to be maintained or repaired is installed, the name of the copying machine 10, etc.

When receiving the e-mail message from the management server 40 (or the communication server 30), the mobile phone 60 displays, on a display unit, the message indicating that the maintenance is required or the message indicating that the repair is required. An input screen is also displayed, which allows the serviceperson to input an estimated time of arrival.

Figure 7:
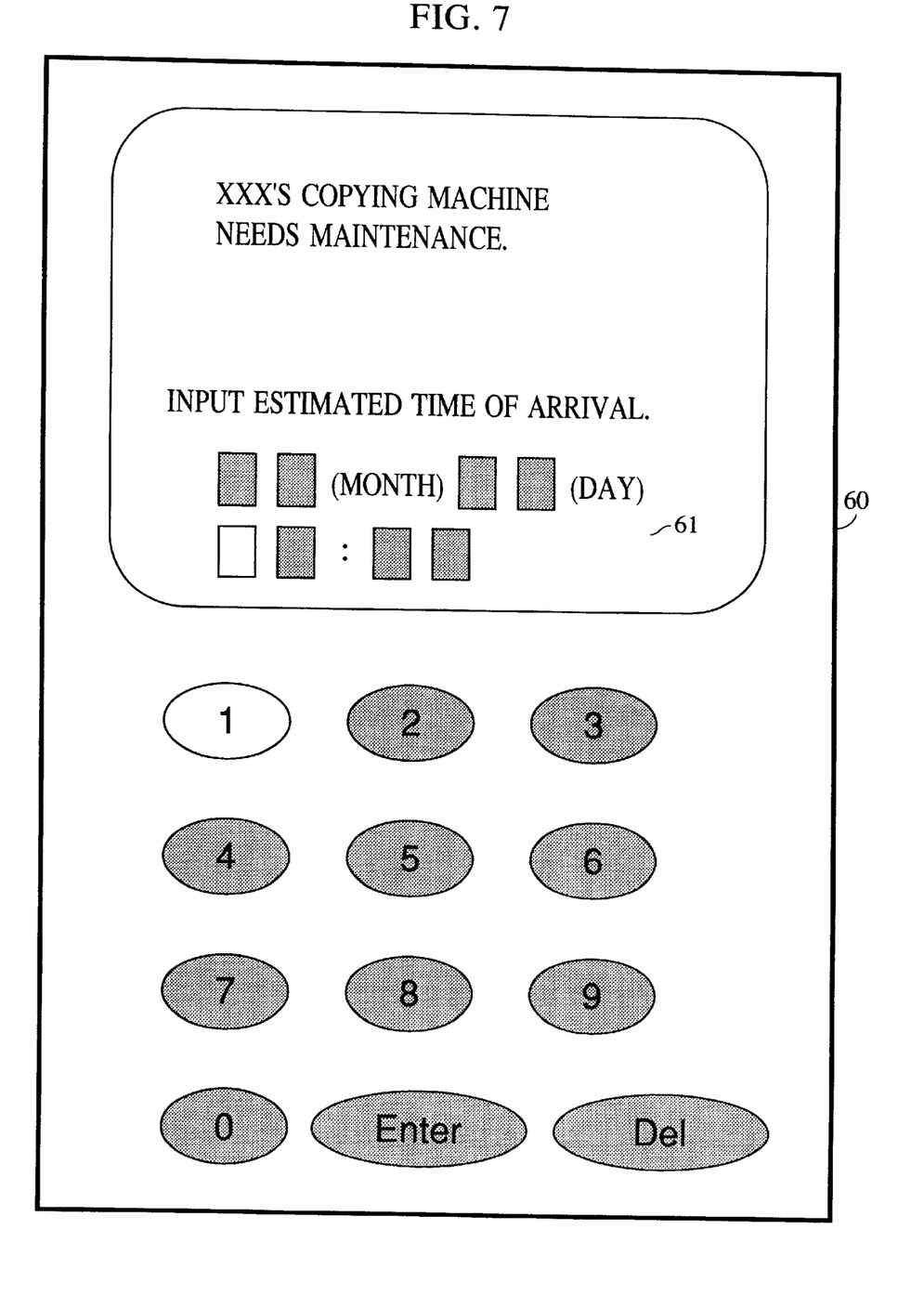
FIG. 7 is an illustration of a displayed screen for inputting an estimated time of arrival.

FIG. 7 shows an example of a screen displayed by the mobile phone 60. By pressing buttons, the serviceperson inputs the estimated time of arrival on an input screen 61. When the management server 40 (or the communication server 30) transmits, in step S301, a plurality of estimated times of arrivals from which an estimated time of arrival is to be selected, the display screen shown in FIG. 8 is displayed.

Figure 8:
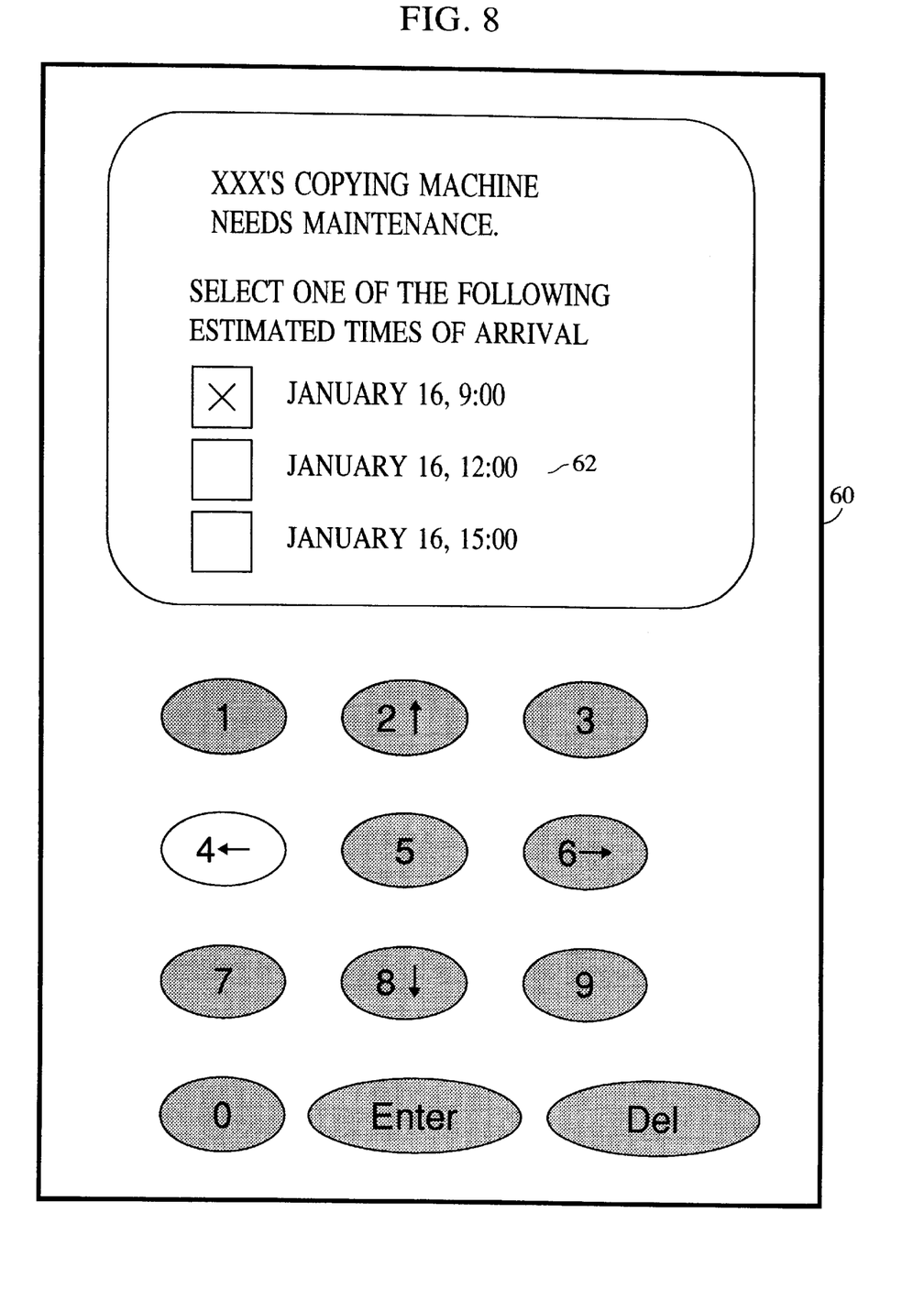
FIG. 8 is an illustration of a displayed screen for selectively inputting estimated times of arrival.

The display screen shown in FIG. 7 or FIG. 8 may be described in the hypertext markup language (HTML). In this case, each mobile phone 60 analyzes HTML data sent from the management server 40 (or the communication server 30), and displays, based on an analysis result, the display screen shown in FIG. 7 or FIG. 8 on its display unit. The management server 40 generates HTML data based on information such as a place where the copying machine 10 is installed, the name of the copying machine 10, the machine type of the copying machine 10, and estimated times of arrival from which an estimated time of arrival is to be selected. The management server 40 transmits the HTML data in step S301.

When an estimated time of arrival is input (selected), in step S302, the mobile phone 60 transmits the input (selected)

time to the management server 40 (or the communication server 30) in step S303. The management server 40 (or the communication server 30) also notifies the copying machine 10 of the transmitted time of arrival. Step S304 corresponds to step S125 shown in FIG. 3.

When receiving the estimated-time-of-arrival data, the copying machine 10 displays the estimated time of arrival in step S305. Step S305 corresponds to step S35 shown in FIG. 1.

Accordingly, the serviceperson can determine an estimated time of arrival in accordance with the present situation of the serviceperson, and the user of the copying machine 10 can know the exact time at which the serviceperson will arrive.

Figure 6:
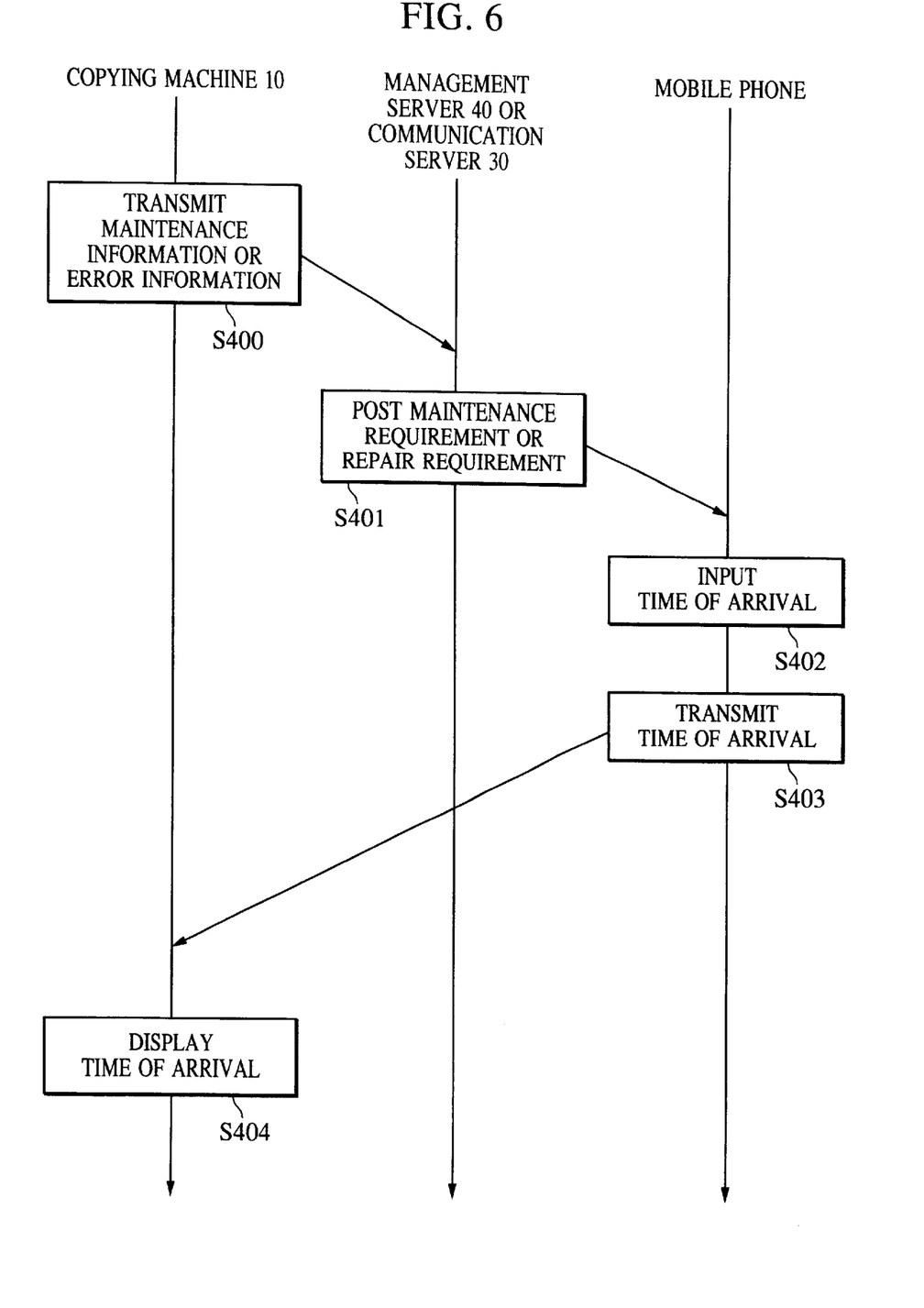
FIG. 6 is a flowchart showing a second combined process for notifying a copying machine 10 (FIG. 1) that a serviceperson will arrive.

In FIG. 5, the estimated-time-of-arrival data is transferred from the mobile phone 60 to the copying machine 10 via the management server 40. However, the estimated-time-of-arrival data can be directly transferred from the mobile phone 60 to the copying machine 10. FIG. 6 is a flowchart of a second combined process for notifying the copying machine 10 of an estimated time of arrival. In step S400, the copying machine 10 transmits maintenance information or error information. Step S400 corresponds to each of steps S15 and S25 in FIG. 2.

The management server 40 (or the communication server 30) determines whether maintenance is required (step S202), or performs diagnosis for finding malfunction (step S211). If the management server 40 (or the communication server 30) has determined that maintenance is required, in step S401, it acquires the mail address of the serviceperson's mobile phone 60, and uses e-mail to notify the mobile phone 60 that the maintenance is required. If the result of the diagnosis indicates the need for repair, in step S401, the management server 40 (or the communication server 30) uses e-mail to notify the mobile phone 60 of the need for repair. Step S401 corresponds to each of steps S203 and S212 in FIG. 4, and step S125 in FIG. 3.

At this time, the management server 40 (or the communication server 30) also transmits information such as a place where the copying machine 10, which is maintained or repaired, is installed, the name of the copying machine 10, a mail address assigned to the copying machine 10.

When receiving the e-mail from the management server 40 (or the communication server 30), the mobile phone 60 displays, on its display unit, a message indicating that maintenance is required or a message indicating that repair is required. The mobile phone 60 also displays, on its display unit, an input screen for allowing the serviceperson to input an estimated time of arrival.

When an estimated time of arrival is input (selected), in step S403, the mobile phone 60 transmits the input (selected) time to the copying machine 10, using the mail address assigned to the copying machine 10.

When receiving estimated-time-of-arrival data, in step S404, the copying machine 10 displays the estimated time of arrival on the display panel. Step S404 corresponds to step S35 in FIG. 1.

As described above, the time at which the serviceperson will arrive is directly transmitted from the serviceperson to the copying machine 10, so that the copying machine 10 is quickly notified of the estimated time of arrival.

In the above-described embodiment, the management server 40 determines whether repair by the serviceperson is required. However, the communication server 30 may have this function. In this case, in the communication server 30, an HTML document (so-called a "homepage") for consultation about malfunctions is prepared. The user uses a personal computer (or the like) to access the homepage in the communication server 30 via the communication network 20.

The user controls the personal computer to display the homepage, and transmits malfunction details from the personal computer to the communication server 30. The communication server 30 transmits, to the user's personal computer, a response corresponding to the malfunction details. If necessary, the communication server 30 notifies the user's personal computer that the serviceperson will go to repair the malfunction.

By providing a scheduler (scheduling software) in the management server 40, the serviceperson's schedule may be automatically determined by the scheduler when the management server 40 is notified of an error by the copying machine 10.

The management server 40 can determine, based on maintenance information that is periodically sent from each copying machine 10, whether periodic inspection is required. For example, the management server 40 determines whether the number of copies produced reaches a predetermined number of copies, and if the determination is affirmative, the management server 40 posts, to the mobile phone 60, a message indicating that periodic inspection will be performed, the machine-type name of the copying machine 10, and the name of the user.

In the above-described embodiment, the mobile phone 60 is exemplified as the electronic device carried by the serviceperson. However, various types of portable electronic apparatuses, such as portable information terminals called "electronic notebooks" and notebook personal computers, can be used. In addition, information can be delivered from the management server 40 to the electronic apparatus in the form of characters, sound, etc. The mobile phone 60 or another type of information terminal can transmit or receive e-mail and HTML data by using radio waves.

By using the communication function between the mobile phone 60 of the serviceperson and the management server 40, information delivery other than the above-described type may be performed. For example, information such as a report on the result of a repair effort can be performed.

The management server 40 may use a LAN to transfer data that is transmitted from the mobile phone 60 of the serviceperson to personal computers in in-company departments relevant to the data. For example, when the serviceperson does not carry necessary replacement components for the copying machine 10, request to supply the replacement components and their names are posted from the mobile phone 60 to a personal computer in the relevant department via the management server 40.

Although the communication server 30 and the management server 40 constitute a maintenance service system in the above-described embodiment, only a single computer can form the maintenance service system.

The above-described embodiment may be variously modified. Modifications will fall within the technical range of the present invention in so far as the modifications are based on the technical thought described in the appended claims.

As described above, according to the present invention, information from each electronic apparatus to be maintained is transferred to a receiving unit of a maintenance service system, and maintenance-related information, such as error information and additional components required for repair, is sent from a transmitting unit to a portable electronic apparatus carried by a serviceperson. Accordingly, the serviceperson can know error details beforehand without directly checking the electronic apparatus to be maintained.

In the present invention, by transmitting an estimated time of arrival of the serviceperson from the maintenance service system to an electronic apparatus to be maintained, the user of the electronic apparatus can know the estimated time of arrival.

Moreover, the communication between an electronic apparatus to be maintained and a maintenance service system is used to send information for calculating an electronic-apparatus lease or rental charge from the electronic apparatus to the maintenance service system, whereby it is not required for a serviceperson to read the information from the copying machine 10, for example, as the electronic apparatus.

While the present invention has been described with reference to what are presently considered the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A maintenance system for using a network to manage apparatuses linked thereto, comprising:
    a receiver adapted to receive maintenance information required for maintaining each of the apparatuses;
    a message-transfer unit adapted to transfer, to an information terminal of a serviceperson, a message created based on the maintenance information received by said receiver and which instructs the serviceperson to perform maintenance;
    an input unit adapted to allow the serviceperson to input, when the transferred message is displayed by the information terminal, an estimated time of arrival at a location of one of the apparatuses requiring maintenance; and
    a transfer unit adapted to transfer the estimated time of arrival to the apparatus requiring maintenance, which is inputted by the serviceperson in said input unit.

2. A maintenance system according to claim 1, further comprising display-control unit adapted to display the estimated time of arrival on a display unit of the apparatus requiring maintenance.

3. A maintenance system according to claim 1, wherein said message-transfer unit transfers the maintenance information together with the message.

4. A maintenance system according to claim 1, wherein:
    said message-transfer unit transfers a plurality of estimated times of arrival, from which an estimated time of arrival is to be selected, together with the message; and
    said transfer unit transfers one of the plurality of estimated times of arrival selected by the serviceperson.

5. A maintenance system for using a network to manage apparatuses linked thereto, comprising:
    a receiver adapted to receive maintenance information required for maintaining each of the apparatuses;
    a diagnosis unit adapted to perform a diagnosis for specifying each component required for the maintenance; and
    a message-transfer unit adapted to transfer, to an information terminal of a serviceperson, a message created based on the maintenance information received by said receiver and which instructs the serviceperson to perform maintenance,
    wherein said message-transfer unit transfers information on each specified component together with the message.

6. A maintenance system according to claim 5, wherein:
    said diagnosis unit finds, based on the diagnosis, a quantity of components required for repair; and
    said message-transfer unit transfers the quantity of components required together with the message.

7. A maintenance system according to claim 1, wherein the maintenance information includes information necessary to calculate a maintenance charge for each of the apparatuses.

8. A maintenance system according to claim 1, further comprising a determination unit adapted to determine whether the maintenance information is information required for the maintenance or information representing a malfunction, wherein said message-transfer unit transfers a message instructing the serviceperson to perform maintenance operations when said determination means unit determines that the maintenance information is information required for the maintenance, and transfers a message instructing the serviceperson to perform repair operations when said determination unit determines that the maintenance information is information representing a malfunction.

9. A maintenance system according to claim 1, wherein said message-transfer unit transfers the message by radio waves.

10. A maintenance system according to claim 1, wherein each of the apparatuses is one of a copying machine, a printer, and a multifunction apparatus.

11. A maintenance method of using a network to manage apparatuses linked thereto, comprising:
    a receiving step of receiving maintenance information required for maintaining each of the apparatuses;
    a message-transfer step of generating a maintenance-instruction message based on the received maintenance information and transferring the message to an information terminal of a serviceperson; and
    a transfer step for, when the message is displayed by the information terminal, transferring, to one of the apparatuses requiring the maintenance, an estimated time of arrival of the serviceperson at a location of the apparatus requiring maintenance, which is input by the serviceperson using the information terminal.

12. A maintenance method according to claim 11, further comprising a display-control step of displaying the transferred estimated time of arrival on a display unit of the apparatus.

13. A maintenance method according to claim 11, wherein, in said message-transfer step, the maintenance information is transferred together with the message.

14. A maintenance method according to claim 11, wherein:
    in said message-transfer step, a plurality of estimated times of arrival, from which an estimated time of arrival is to be selected is transferred together with the message; and
    in said transfer step, an estimated time of arrival selected by the serviceperson is transferred.

15. A maintenance method of using a network to manage apparatuses linked thereto, comprising:

a receiving step of receiving maintenance information required for maintaining each of the apparatuses;

a diagnosis step of performing a diagnosis for specifying each component required for the maintenance; and a message-transfer step of generating a maintenance-instruction message based on the received maintenance information and transferring the message to an information terminal of a serviceperson, wherein, in said message-transfer step, information on each specified component is transferred together with the message.

16. A maintenance method according to claim 15, wherein:

a quantity of components required for repair is found based on the diagnosis; and, in said message-transfer step, the quantity of components required is transferred together with the message.

17. A maintenance method according to claim 11, wherein the maintenance information includes information necessary to calculate a maintenance charge for each of the apparatuses.

18. A maintenance method according to claim 11, further comprising a determination step of determining whether the maintenance information is information required for the maintenance or information representing malfunction, wherein, in said message-transfer step, a message instructing the serviceperson to perform maintenance operations is transferred when it is determined that the maintenance information is information required for maintenance, and a message instructing the serviceperson to perform repair operations is transferred when it is determined that the maintenance information is information representing a malfunction.

19. A maintenance method according to claim 11, wherein, in said message-transfer step, the message is transferred by radio waves.

20. A maintenance method according to claim 11, wherein each of the apparatuses is one of a copying machine, a printer, and a multifunction apparatus.

21. A computer-readable recording medium storing a control program for implementing a method of controlling a maintenance system that uses a network to manage apparatuses linked thereto, the control program controlling a computer in the maintenance system to execute a process, and the control program comprising:

code for a receiving step of receiving maintenance information required for maintaining each of the apparatuses;

code for a message-transfer step of generating a maintenance-instruction message based on the received maintenance information and transferring the message to an information terminal of a serviceperson; and code for a transfer step of, when the message is displayed by the information terminal, transferring, to one of the apparatuses requiring the maintenance, an estimated time of arrival of the serviceperson at a location of the apparatus requiring maintenance, which is input by the serviceperson using the information terminal.

22. A control program product for controlling a maintenance system that uses a network to manage apparatuses linked thereto, said control program product controlling a computer in the maintenance system to execute a process, said control program product comprising:

code for a receiving step of receiving maintenance information required for maintaining each of the apparatuses;

code for a message-transfer step of generating a maintenance-instruction message based on the received maintenance information and transferring the message to an information terminal of a serviceperson; and code for a transfer step of, when the message is displayed by the information terminal, transferring, to one of the apparatuses requiring the maintenance, an estimated time of arrival of the serviceperson at a location of the apparatus requiring maintenance, which is input by the serviceperson using the information terminal.

* * * * *